US008988190B2

(12) United States Patent
Lawrence et al.

(10) Patent No.: US 8,988,190 B2
(45) Date of Patent: Mar. 24, 2015

(54) GESTURE BASED ELECTRONIC LATCH FOR LAPTOP COMPUTERS

(75) Inventors: Bradley M. Lawrence, Austin, TX (US); Keith A. Kozak, Round Rock, TX (US); Nicolas A. Denhez, San Francisco, CA (US)

(73) Assignee: Dell Products, LP, Round Rock, TX (US)

( * ) Notice: Subject to any disclaimer, the term of this patent is extended or adjusted under 35 U.S.C. 154(b) by 736 days.

(21) Appl. No.: 12/553,162

(22) Filed: Sep. 3, 2009

(65) Prior Publication Data

US 2011/0050388 A1    Mar. 3, 2011

(51) Int. Cl.
| | |
|---|---|
| G05B 19/00 | (2006.01) |
| G06F 21/31 | (2013.01) |
| G06F 21/36 | (2013.01) |
| G06F 21/88 | (2013.01) |

(52) U.S. Cl.
CPC .............. G06F 21/31 (2013.01); G06F 21/316 (2013.01); G06F 21/36 (2013.01); G06F 21/88 (2013.01)
USPC ................ 340/5.8; 715/863; 70/58; 710/200; 713/186; 345/173; 382/195; 178/19.01

(58) Field of Classification Search
CPC ....... G06F 3/04883; G06F 1/183; G06F 1/26; G06F 21/32; G06F 3/017; G06F 3/04847; E05B 47/0009; H04M 1/67
USPC .................... 340/5.8; 312/333; 345/156, 173; 361/679.57, 726, 732, 747; 715/863; 70/58; 710/200; 713/186; 382/195; 178/19.01
See application file for complete search history.

(56) References Cited

U.S. PATENT DOCUMENTS

| | | | | |
|---|---|---|---|---|
| 4,426,862 | A | * | 1/1984 | Yamada et al. .................... 70/69 |
| 4,742,426 | A | * | 5/1988 | Lavelle .......................... 361/171 |
| 4,853,829 | A | * | 8/1989 | Buzzelli ......................... 361/715 |
| 5,543,588 | A | * | 8/1996 | Bisset et al. ............... 178/18.06 |
| 5,636,101 | A | | 6/1997 | Bonsall et al. |
| 5,821,930 | A | * | 10/1998 | Hansen ......................... 715/702 |
| 5,903,229 | A | * | 5/1999 | Kishi ............................... 341/20 |
| 5,933,085 | A | * | 8/1999 | Holcomb et al. ............ 340/5.66 |
| 5,943,044 | A | * | 8/1999 | Martinelli et al. ............ 345/174 |
| 6,008,983 | A | * | 12/1999 | Yen .......................... 361/679.11 |
| 6,008,992 | A | * | 12/1999 | Kawakami .................... 361/726 |
| 6,096,984 | A | | 8/2000 | Howell et al. |
| 6,129,395 | A | | 10/2000 | Schlesener et al. |
| 6,134,116 | A | | 10/2000 | Hoss et al. |
| 6,249,606 | B1 | * | 6/2001 | Kiraly et al. .................. 382/195 |
| 6,297,948 | B1 | | 10/2001 | Buican et al. |
| 6,330,817 | B1 | * | 12/2001 | Frolov ............................ 70/280 |
| 6,337,918 | B1 | * | 1/2002 | Holehan ....................... 382/124 |
| 6,639,584 | B1 | * | 10/2003 | Li ................................... 345/173 |
| 6,867,701 | B2 | | 3/2005 | Lawrence et al. |
| 7,016,187 | B2 | | 3/2006 | Sura et al. |
| 7,088,576 | B2 | | 8/2006 | Denhez |

(Continued)

*Primary Examiner* — Benjamin C. Lee
*Assistant Examiner* — Quang D Pham
(74) *Attorney, Agent, or Firm* — Larson Newman, LLP

(57) ABSTRACT

A portable information handling system includes a top cover, a base, and an electronic latch. The top cover is connected to the base. The top cover has a gesture sensitive surface configured to receive a trace. The electronic latch is in communication with the gesture sensitive surface, and is configured to latch the top cover and the base together. The electronic latch is further configured to unlatch the top cover from the base in response to receiving a signal representing that the trace received on the gesture sensitive surface is proper.

14 Claims, 7 Drawing Sheets

(56) References Cited

U.S. PATENT DOCUMENTS

| | | |
|---|---|---|
| 7,203,058 B2* | 4/2007 | Hong ................... 361/679.06 |
| 7,248,151 B2* | 7/2007 | McCall ................... 340/426.35 |
| 7,295,882 B2 | 11/2007 | Champion et al. |
| 7,480,154 B2 | 1/2009 | Lawrence et al. |
| 7,513,579 B2 | 4/2009 | Nay et al. |
| 7,855,634 B2* | 12/2010 | Fitzgibbon et al. .......... 340/5.71 |
| 2002/0006222 A1* | 1/2002 | Inagaki et al. ................ 382/181 |
| 2002/0109677 A1* | 8/2002 | Taylor ........................ 345/173 |
| 2002/0145862 A1* | 10/2002 | Uehara et al. .................... 362/85 |
| 2003/0048600 A1* | 3/2003 | Hsu et al. ...................... 361/683 |
| 2003/0142472 A1* | 7/2003 | Park ............................. 361/683 |
| 2004/0114315 A1* | 6/2004 | Anlauff ........................ 361/681 |
| 2004/0201601 A1 | 10/2004 | Ke |
| 2004/0207596 A1* | 10/2004 | Yu ................................ 345/156 |
| 2005/0185369 A1 | 8/2005 | Chiu et al. |
| 2005/0252260 A1* | 11/2005 | Chu ................................ 70/262 |
| 2006/0023427 A1 | 2/2006 | Strmiska et al. |
| 2006/0119481 A1* | 6/2006 | Tethrake et al. ........... 340/572.1 |
| 2006/0236262 A1* | 10/2006 | Bathiche et al. ............. 715/786 |
| 2006/0267951 A1* | 11/2006 | Rainisto ....................... 345/173 |
| 2006/0268501 A1 | 11/2006 | Marroquin et al. |
| 2007/0013477 A1* | 1/2007 | Fitzgibbon et al. .......... 340/5.52 |
| 2007/0018790 A1 | 1/2007 | LaFrance |
| 2007/0077788 A1* | 4/2007 | Jiang et al. ...................... 439/71 |
| 2007/0133156 A1 | 6/2007 | Ligtenberg et al. |
| 2007/0138806 A1 | 6/2007 | Ligtenberg et al. |
| 2007/0150826 A1* | 6/2007 | Anzures et al. ............... 715/772 |
| 2007/0177769 A1* | 8/2007 | Motoyama et al. ........... 382/115 |
| 2007/0255961 A1* | 11/2007 | Tracy et al. ................... 713/186 |
| 2008/0165145 A1* | 7/2008 | Herz et al. .................... 345/173 |
| 2008/0168403 A1* | 7/2008 | Westerman et al. .......... 715/863 |
| 2008/0223089 A1* | 9/2008 | Tzeng et al. ...................... 70/58 |
| 2008/0253624 A1* | 10/2008 | Wong et al. .................. 382/124 |
| 2008/0297433 A1* | 12/2008 | Heller et al. ................... 345/2.1 |
| 2009/0045636 A1 | 2/2009 | Marroquin et al. |
| 2009/0083850 A1* | 3/2009 | Fadell et al. .................... 726/19 |
| 2009/0108914 A1 | 4/2009 | Zhang et al. |
| 2009/0122019 A1 | 5/2009 | Lin et al. |
| 2009/0138800 A1* | 5/2009 | Anderson et al. ............ 715/702 |
| 2009/0158222 A1* | 6/2009 | Kerr et al. ..................... 715/867 |
| 2009/0164042 A1* | 6/2009 | Handfield et al. ............ 700/216 |
| 2009/0179853 A1* | 7/2009 | Beale ............................ 345/156 |
| 2009/0184525 A1* | 7/2009 | Tseng ........................... 292/300 |
| 2009/0203355 A1* | 8/2009 | Clark ............................ 455/411 |
| 2009/0241072 A1* | 9/2009 | Chaudhri et al. ............. 715/863 |
| 2009/0262074 A1* | 10/2009 | Nasiri et al. .................. 345/158 |
| 2009/0302990 A1* | 12/2009 | Neilly et al. .................. 337/312 |
| 2010/0013597 A1* | 1/2010 | Determan et al. ........... 340/5.82 |
| 2010/0058252 A1* | 3/2010 | Ko ................................ 715/863 |
| 2010/0060417 A1* | 3/2010 | Niinuma ..................... 340/5.82 |
| 2010/0071041 A1* | 3/2010 | Ikegami ........................... 726/6 |
| 2010/0123597 A1* | 5/2010 | Kitsukawa ................... 340/825 |
| 2010/0146619 A1* | 6/2010 | Chen ............................... 726/19 |
| 2010/0147041 A1* | 6/2010 | Teicher et al. .................... 70/58 |
| 2011/0010626 A1* | 1/2011 | Fino et al. .................... 715/727 |
| 2011/0066984 A1* | 3/2011 | Li .................................. 715/863 |
| 2011/0169764 A1* | 7/2011 | Miyoshi ........................ 345/173 |

* cited by examiner

GESTURE BASED ELECTRONIC LATCH FOR LAPTOP COMPUTERS

FIELD OF THE DISCLOSURE

This disclosure relates generally to information handling systems, and more particularly relates to a gesture based electronic latch for laptop computers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable computers, such as laptops, generally include a top cover and a base. The top cover can include a screen for displaying images from a video card within the laptop, and the base can include a keyboard and other components of the laptop. When the portable computer is transported, the top cover can fold down and latch to the base.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
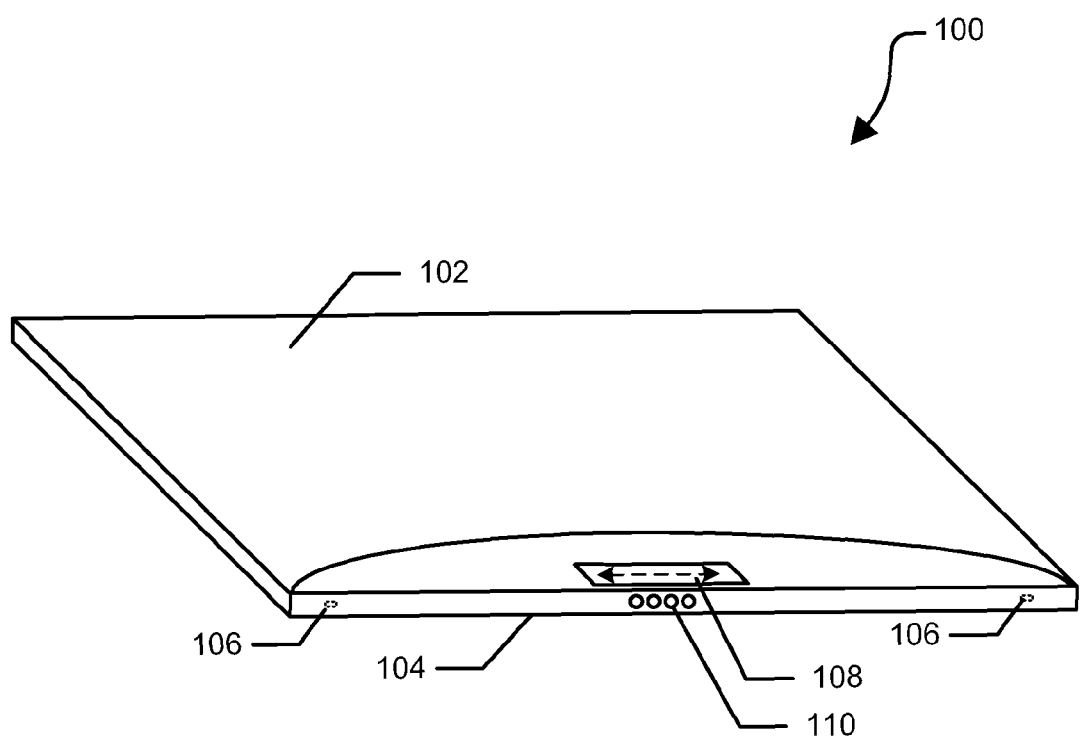
FIGS. 1-3 are perspective views of a portable computer with different embodiments of a gesture sensitive surface.
Figure 2:
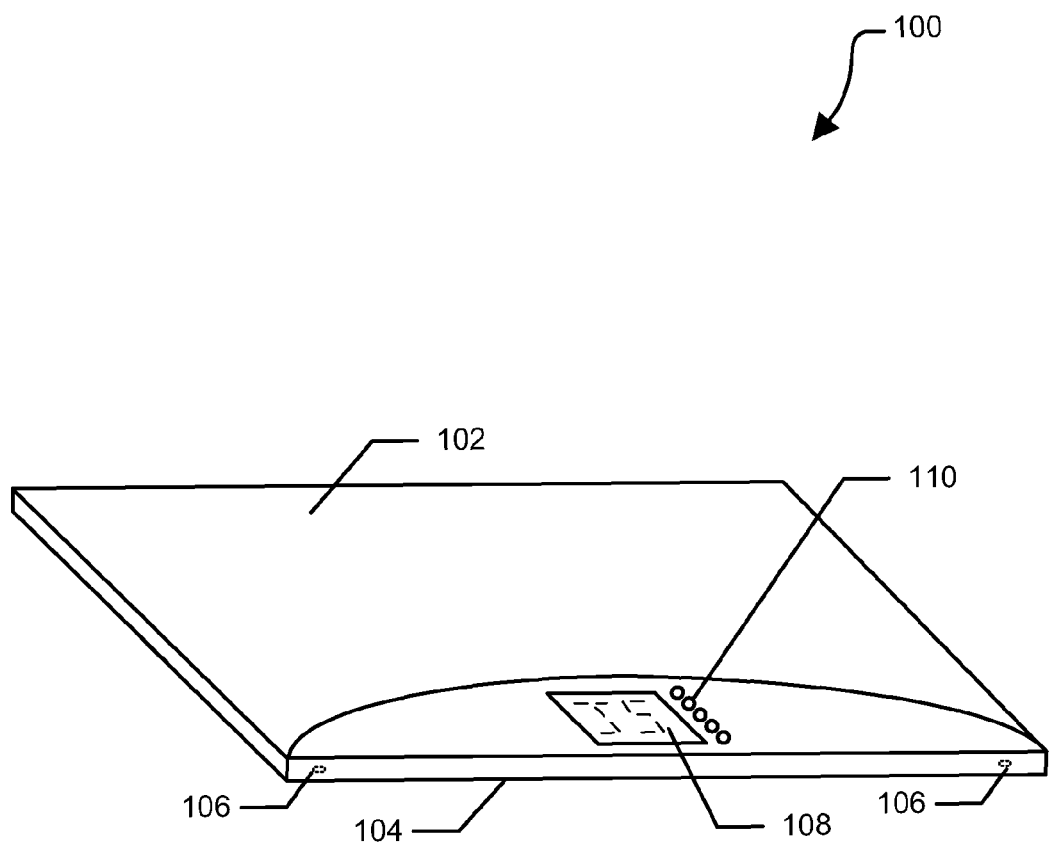
Figure 3:
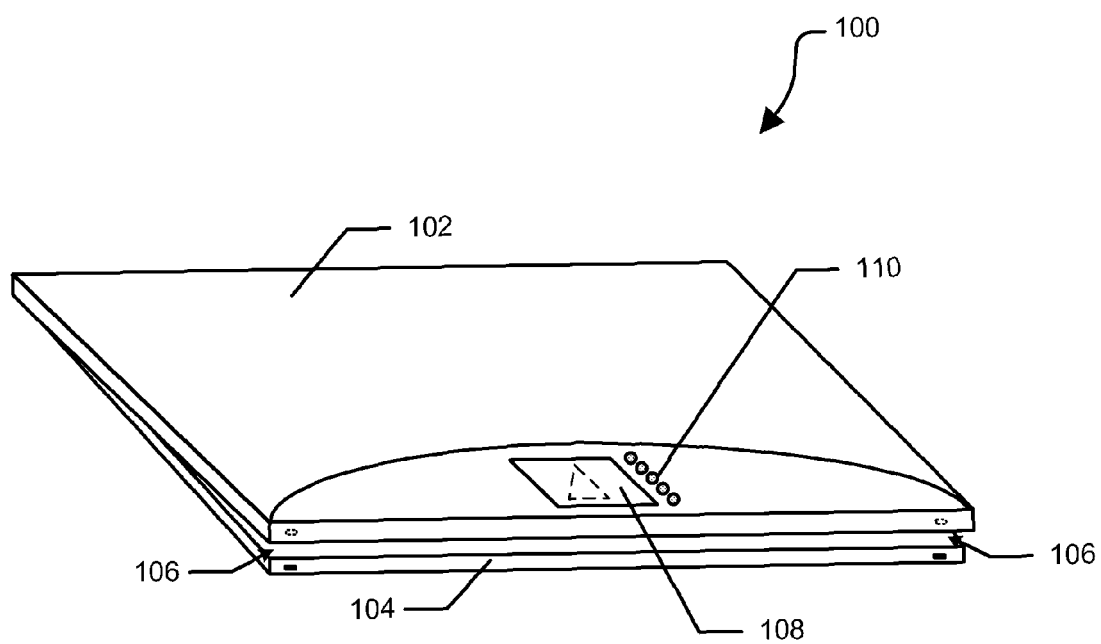

FIGS. 1-3 show a portable computer 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The portable computer 100 includes a top cover 102, a base 104, electronic latches 106, a gesture sensitive surface 108, and multiple light emitting diodes (LEDs) 110. The top cover 102 is preferably hinged to the base 104 in a conventional manner, while the electronic latches 106 are preferably located at opposite ends of a front edge of the top cover 102. It should be appreciated, however, that the electronic latches 106 can be positioned at any location of the top cover 102 and/or the base 104. The gesture sensitive surface 108 and the LEDs 110 are preferably located on the top cover 102. When the portable computer 100 is closed, the electronic latches 106 can be engaged to hold the top cover 102 around the front and sides of the base 104, such that only the top cover can be seen as viewed in FIG. 1. In another embodiment, when the portable computer 100 is closed, the electronic latches 106 can be engaged to hold the top cover 102 in physical opposition to the top of the base 104, such that both the top cover and the base can be seen from the front.

The gesture sensitive surface 108 can be a capacitive sensing technology touchpad. The gesture sensitive surface 108 can receive an input or trace from a user to unlock the electronic latches 106. For example, if the gesture sensitive surface 108 utilizes capacitive sensing technology, the gesture sensitive surface can have an operating surface that includes a grid array of capacitive lines. By tapping or touching the operating surface, the user can distort its electrical field such that the gesture sensitive surface 108 can sense a location of the user's finger on the operating surface. The user can also trace or swipe his finger across the gesture sensitive surface 108 to induce a signal associated with the trace and/or swipe of the finger.

When a trace is received on the gesture sensitive surface 108, it can be compared to a stored trace to determine whether the trace is a proper trace, such as when a finger is swiped from one end of the gesture sensitive surface 108 to the other end as shown in FIG. 1. In an embodiment, the gesture sensitive surface 108 can be sufficiently large for the user to be able to trace different letters, numbers, shapes, and the like on the gesture sensitive surface. For example, the user can trace alphanumeric characters and/or geometric shapes on the gesture sensitive surface 108 to unlock the electronic latches 106 as shown in FIGS. 2 and 3. The different letters, number, and/or shapes can be custom traces set by the user to unlock the electronic latches 106, as discussed more fully below with respect to FIG. 6.

When the user swipes his finger across the gesture sensitive surface 108, the LEDs 110 can light up according to the trace to provide a visual feedback that a proper trace is being received. For example, as the user swipes his finger across the gesture sensitive surface 108, the LED 110 next to the current location of the finger on the gesture sensitive surface can light up. Thus, the LEDs 110 can light up from left to right or right to left depending on the direction that the user swipes his finger across the gesture sensitive surface 108. In another embodiment, all of the LEDs 110 can light up at substantially the same time when a proper trace is received, as shown in FIG. 3, or remain unlit if an improper trace is received. In another embodiment, the LEDs 110 can be replaced by any type of visual or audio indicator, such as a liquid crystal display (LCD) and the like.

When the gesture sensitive surface 108 receives a proper trace, a signal can be sent to the electronic latches 106 causing the electronic latches to unlock. When the electronic latches 106 are unlocked, a spring loaded mechanism between the top cover 102 and the base 104 can cause the top cover to separate slightly from the base as shown in FIG. 3. As the electronic latches 106 unlock, an audible click can be produced. The popping up of the top cover 102 and the audible click can be visual and audible feedbacks for the user that a proper trace was received on the gesture sensitive surface 108. However, if an improper trace is received, the electronic latches 106 can remain locked.

In another embodiment the touchpad can be a pressure sensitive touchpad, a biometric reader touchpad, and the like. If the touchpad is a pressure sensitive touchpad, the pressure of a user's finger on a membrane switch array within the operating surface can provide output control signals associated with the trace. If the touchpad is a biometric reader, the user can hold or slide his finger over the biometric reader so that the user's fingerprint can be scanned. If the scanned fingerprint matches a stored fingerprint, the electronic latches 106 can be unlocked.

Figure 4:
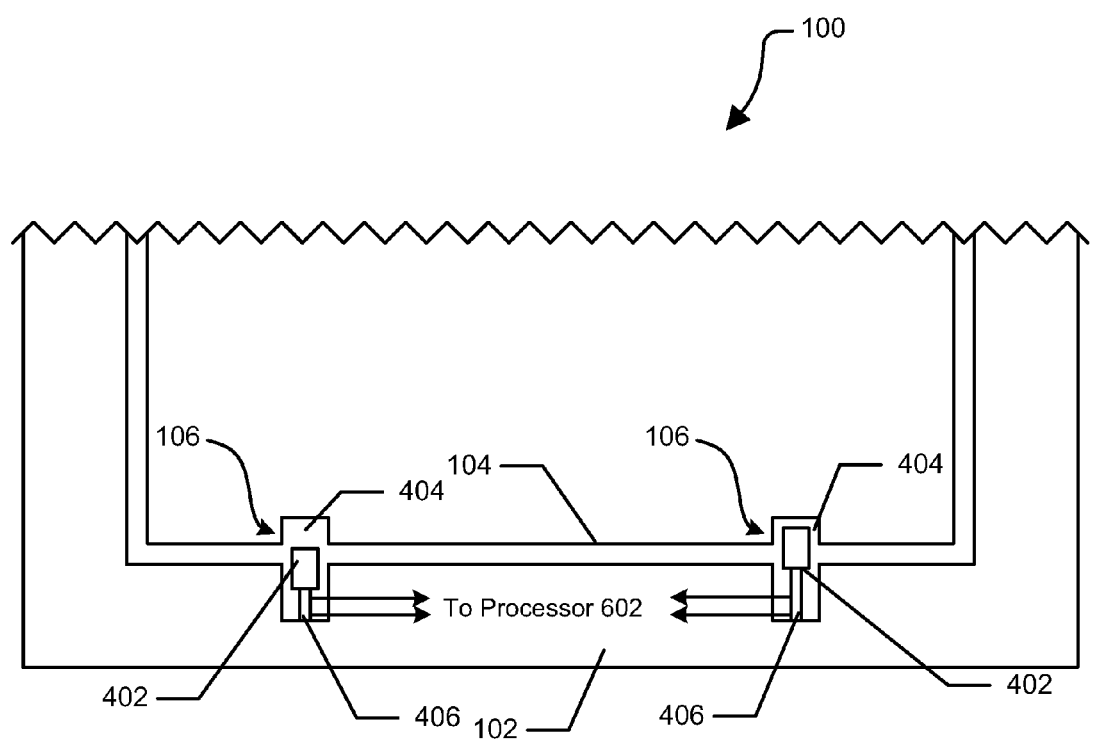
FIG. 4 is a partial schematic view of a cross-section of an embodiment of the portable computer including electronic latches.

FIG. 4 shows a cross-sectional view of the portable computer 100 including the electronic latches 106, each of which has a hook portion 402, a catch portion 404, and a rod 406. The hook portion 402 is connected to the rod 406, and the hook portion and the rod are both preferably located within a recess of the top cover 102. The catch portion 404 is preferably located within the base portion 104. In another embodiment, the hook portion 402 and the rod 406 can be located within the base 104, and the catch portion 404 can be located within the top cover 102.

The rod 406 can be a heat sensitive rod, such as a nickel-titanium rod, that can constrict as it heats up. When the rod 406 receives the unlock signal, the current from the unlock signal can cause the rod to heat up and constrict. As the rod 406 constricts, the rod can pull the hook portion 402 from the catch portion 404. When the hook portion 402 is released from the catch portion 404, the top cover 102 is biased away from the base 104 to a partially open position. After a specific amount of time, the unlock signal is no longer sent to the rod 406, such that the heat can dissipate from the rod and the rod can expand. As the rod 406 expands, the hook portion 402 can return to a position ready to engage within the catch portion 404. A user can press the top cover 102 downward toward the base 104 to close the portable computer 100. When the hook portion 402 aligns with the catch portion 404, the hook portion can engage and lock within the catch portion to lock the electronic latches 106 and to keep the portable computer 100 closed.

Figure 5:
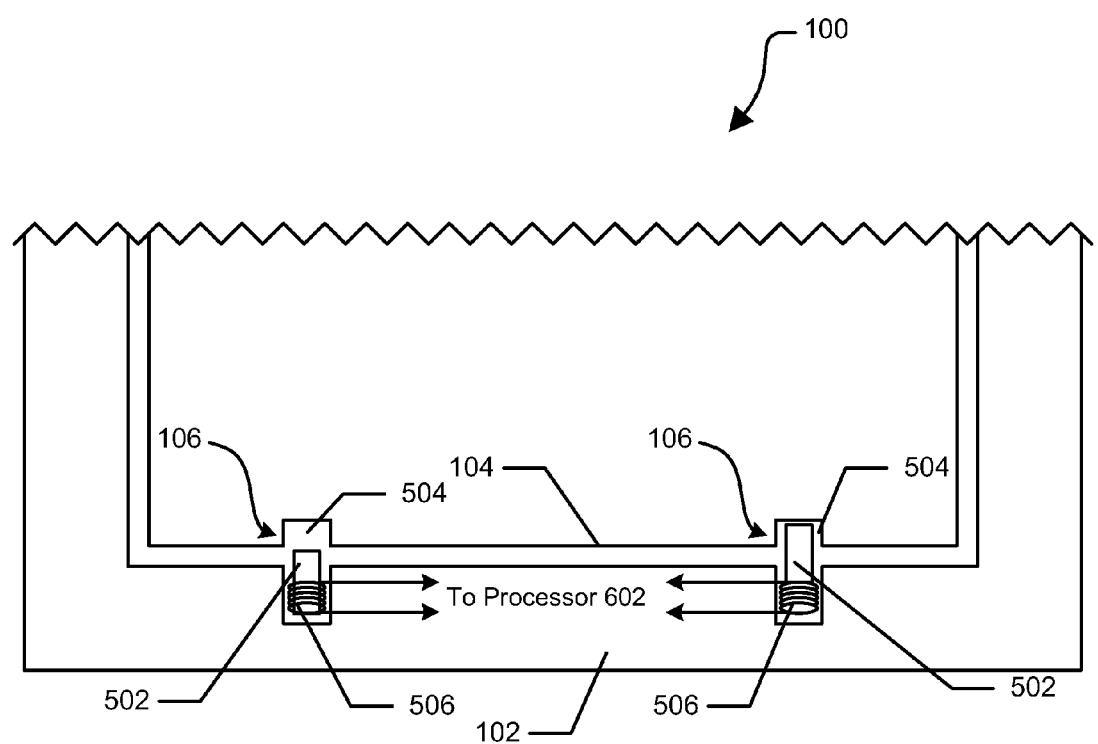
FIG. 5 is a partial schematic view of a cross-section of another embodiment of the portable computer.

FIG. 5 shows a cross-sectional view of the portable computer 100 including another embodiment of the electronic latches 106, each of which has a hook portion 502, a catch portion 504, and a coil 506. The hook portion 502 is preferably located within the coil 506, which in turn is located in a recess of the top cover 102. The catch portion 504 is preferably located within the base portion 104. In another embodiment, the hook portion 502 and the coil 506 can be located within the base 104, and the catch portion 504 can be located within the top cover 102. The catch portion 504 can include a permanent magnet that can pull the hook portion 502 within the catch portion to lock the electronic latches 106.

The coil 506 receives the unlock signal, which in turn can induce the coil to create a magnetic field that is greater than the magnetic field of the permanent magnetic within the catch portion 504. Thus, the magnetic field created by the coil 506 can pull the hook portion 502 from the catch portion 504 and within the coil. When the hook portion 502 is released from the catch portion 504, the top cover 102 is biased away from the base 104 to a partially open position. After a specific amount of time, the magnetic field of the coil 506 can dissipate such that the coil is no longer actively holding the hook portion 502 within the coil.

A user can press the top cover 102 downward toward the base 104 to lock the electronic latches 106. When the hook portion 502 aligns with the catch portion 504, the permanent magnetic of the catch portion can pull within the catch portion. Thus, the hook portion 502 can engage and lock within the catch portion 504 to lock the electronic latches 106 and to keep the portable computer 100 closed. In another embodiment, the electronic latches 106 can be any type of latches that can unlock when a proper trace is received.

Figure 6:
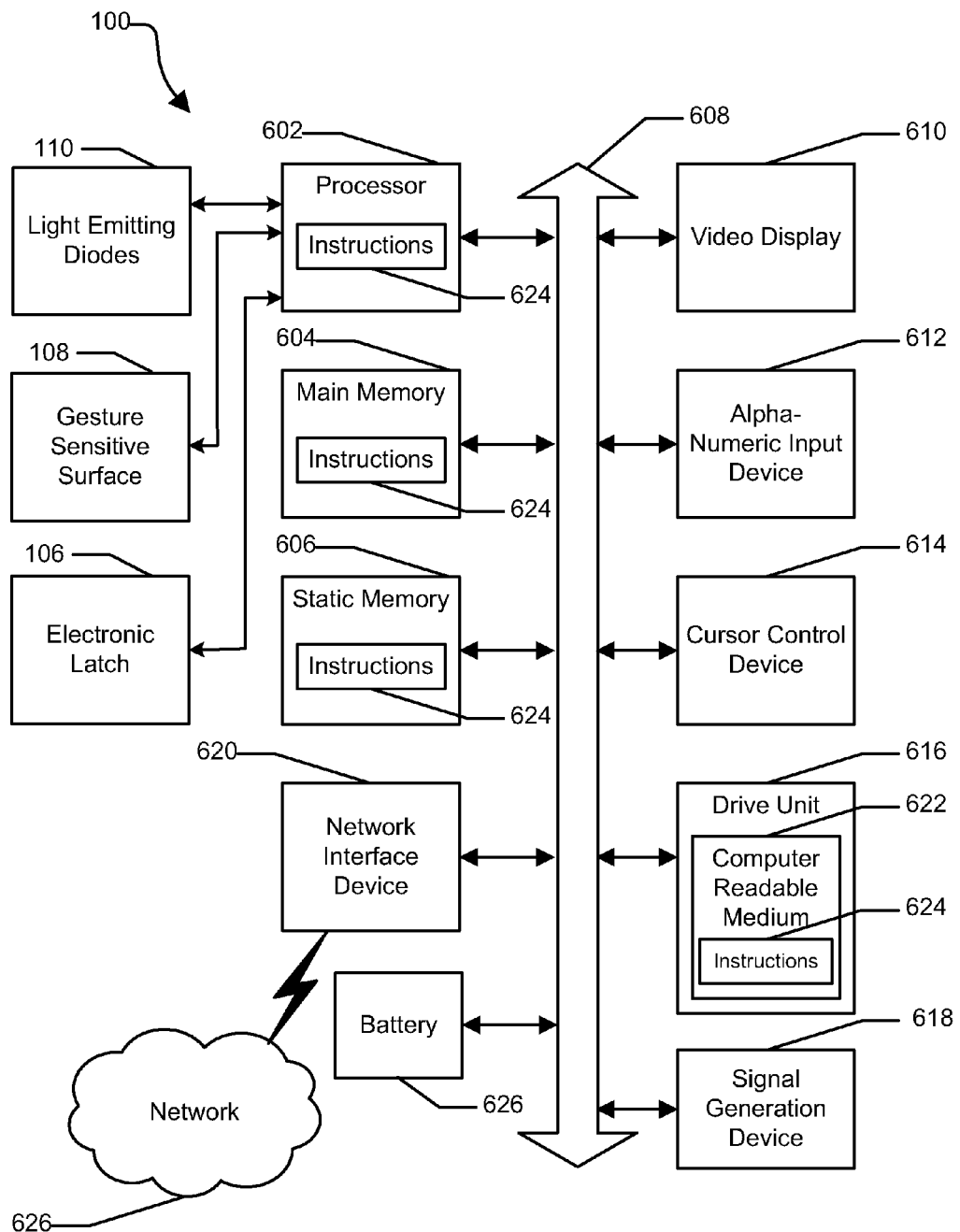
FIG. 6 is a block diagram of the portable computer.

FIG. 6 shows an embodiment of a portable computer 100 in accordance with at least one embodiment of the present disclosure. The portable computer 100 can include a set of instructions that can be executed to cause the portable computer to perform any one or more of the methods or computer based functions disclosed herein.

The portable computer 100 may include a processor 602 such as a central processing unit (CPU), a graphics processing unit (GPU), and/or a microprocessor. Moreover, the portable computer 100 can include a main memory 604 and a static memory 606 that can communicate with each other via a bus 608. The processor 602 is in communication with the electronic latches 106, the gesture sensitive surface 108, and the LEDs 110. The processor 602 can receive a signal generated, based on the trace, by the gesture sensitive surface 108, and can analyze the signal to determine whether the trace is correct. For example, the processor 602 can compare the trace received on the gesture sensitive surface 108 to a trace stored in the memory 604, and the processor can send an unlock signal to the electronic latches 106 when a proper trace is received. In another embodiment, the processor 604 can send the unlock signal to a register connected as a buffer between the processor and the electronic latches 106. The register can then send the buffered unlock signal to the electronic latches 106.

To create a custom trace, the user can perform a desired trace on the gesture sensitive surface 108, and the processor 602 can then store the desired trace in the memory 604. In another embodiment, prior to setting the desired trace as the custom trace to unlock the electronic latches 106, the processor 602 can verify the desired trace by displaying text on a video display unit 610 requesting that the user perform the desired trace again. The text can The processor 602 can then compare the second desired trace to the first desired trace to ensure that the two traces are substantially the same and identifiable by the processor. If the two traces match and the processor 602 can identify the desired trace when received on the gesture sensitive surface 108, the processor can store the desired trace as the custom trace in the memory 604 and can display text on the video display unit 610 that the custom trace has been saved.

As shown, the portable computer 100 may further include the video display unit 610, such as a liquid crystal display (LCD), an organic light emitting diode (OLED), a flat panel display, or a solid state display. Additionally, the portable computer 100 may include an input device 612 such as a keyboard, and a cursor control device 614 such as a mouse. The portable computer 100 can also include a disk drive unit 616, a signal generation device 618 such as a speaker or remote control, and a network interface device 620.

In a particular embodiment depicted in FIG. 6, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the portable computer 100. The main memory 604 and the processor 602 also may include computer-readable media. The network interface device 620 can provide connectivity to a network 626, such as a wide area network (WAN), a local area network (LAN), or other network. The portable computer 100 also includes a battery 626 to provide power to the components of the portable computer. The battery 626 can be accessible to the components via the bus 608.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the portable computer 100. Further, in an exemplary, non-limited embodiment, implementations can include distributed processing, component/object distributed processing, and parallel processing.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database. The term "computer-readable medium" shall also include any medium that is capable of storing, encoding or carrying a set of instructions for execution by a processor or that cause the portable computer 100 to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 7:
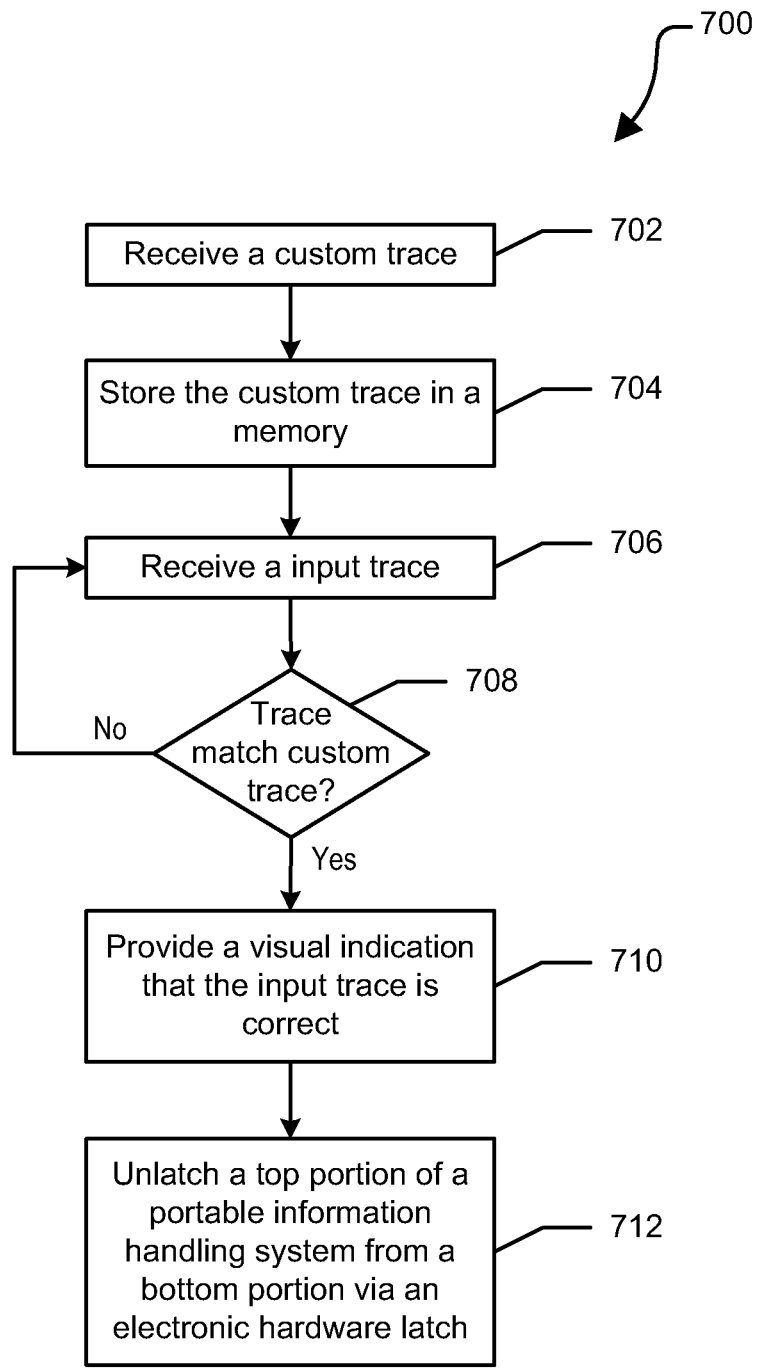
FIG. 7 is a flow diagram of a method for unlatching the electronic latches in response to a trace on the gesture sensitive surface.

FIG. 7 shows a block diagram of a method 700 for unlatching an electronic latch in response to a trace on a gesture sensitive surface. At block 702, a custom trace is received. The custom trace can be input on the gesture sensitive surface, and can be any shape, letter, biometric reading, and the like. The custom trace is stored in a memory at block 704. At block 706, an input trace is received at the gesture sensitive surface. A determination is made whether the input trace matches the custom trace at block 708. If the input trace does not match the custom trace, the flow diagram continues as stated above at block 706. However, if the input trace matches the custom trace, a visual indication that the input trace is correct is provided at block 710. The visual indication can be multiple LEDs lighting up in a specific order, at substantially the same, as a specific color, and the like. At block 712, a top cover of a portable information handling system is unlatched from a base via the electronic latch in response to the correct input trace.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A portable information handling system for performing various computing functions, comprising:
  a base having a front portion, a back portion, a left portion, a right portion, and a bottom portion;
  a top cover connected to and covering the back portion of the base, the top cover having a gesture sensitive surface and a plurality of light emitting diodes, the gesture sensitive surface configured to receive a trace, wherein the trace is a movement of a finger of a user across the gesture sensitive surface, and the light emitting diodes are configured to provide a visual indication that the trace was proper, wherein the visual indication is the light emitting diodes lighting up one by one in a direction that the finger of the user is swiped across the gesture sensitive surface based on a current location of the finger on the gesture sensitive surface; and a processor in communication with the gesture sensitive surface, the processor configured to receive a signal associated with the trace from the gesture sensitive surface, and to determine whether the trace is proper;

an electronic latch in communication with the processor, the electronic latch configured to latch the top cover around the entire front portion, the entire left portion, and the entire right portion of the base wherein only the top cover and the bottom portion of the base are visible when the portable information handling system is closed, wherein the electronic latch including:
  a catch portion located within the base; and
  a coil and a hook portion located within a recess of the top cover; wherein the hook portion is located within the coil and the coil is configured to receive an unlock signal from the processor representing that the trace received on the gesture sensitive surface is proper, and to create a magnetic field in response to the unlock signal, the magnetic field is configured to pull the hook portion from the catch portion to unlatch the top cover from the base in response to receiving the unlock signal from the processor representing that the trace received on the gesture sensitive surface is proper, wherein a spring loaded mechanism between the top cover and the base is configured to cause the top cover to separate slightly from the base in response to the electronic latch being unlocked.

2. The portable information handling system of claim 1 further comprising: the processor in communication with the gesture sensitive surface, the processor configured to receive a custom trace, and further configured to store the custom trace in a memory.

3. The portable information handling system of claim 2 wherein the trace is proper when the trace matches the custom trace stored in the memory.

4. The portable information handling system of claim 2 wherein the custom trace is selected from a group consisting of a shape, a set of initials, a letter, a number, and a design.

5. The portable information handling system of claim 1 wherein the trace is selected from a group consisting of a custom shape drawn on the gesture sensitive surface and a finger swipe along the entire length of the gesture sensitive surface.

6. A portable information handling system for performing various computing functions, comprising:
  a base having a front portion, a back portion, a left portion, a right portion, and a bottom portion;
  a top cover connected to and covering the back portion of the base, the top cover having a gesture sensitive surface configured to receive a trace, wherein the trace is a movement of a finger of a user across the gesture sensitive surface;
  a processor in communication with the gesture sensitive surface, the processor configured to receive a signal associated with the trace from the gesture sensitive surface, and to determine whether the trace is proper;
  a display in communication with the processor, the display including a plurality of light emitting diodes, and configured to provide a visual indication that the trace was proper, wherein the visual indication is the light emitting diodes lighting up one by one in a direction that the finger of the user is swiped across the gesture sensitive surface based on a current location of the finger on the gesture sensitive surface; and
  an electronic latch including a hook portion connected to a heat sensitive rod located within a recess of the top cover and a catch portion located within the base, the electronic latch in communication with the processor, the electronic latch configured to latch the top cover around the entire front portion, the entire left portion, and the entire right portion of the base wherein only the top cover and the bottom portion of the base are visible when the portable information handling system is closed, and further configured to unlatch the top cover from the base in response to receiving an unlock signal from the processor representing that the trace received on the gesture sensitive surface is proper,
  wherein a spring loaded mechanism between the top cover and the base is configured to cause the top cover to separate slightly from the base in response to the electronic latch being unlocked; and
  wherein the processor provides the unlock signal to the heat sensitive rod of the electronic latch, a current from the unlock signal causes the heat sensitive rod to heat up and constrict, as the heat sensitive rod constricts, a length of the heat sensitive rod is decreased to pull the hook portion from the catch portion to release the hook portion from the catch portion and unlock the top cover from the base.

7. The portable information handling system of claim 6 wherein the processor is further configured to receive a custom trace from the gesture sensitive surface, and to store the custom trace in a memory.

8. The portable information handling system of claim 7 wherein the trace is proper when the trace matches the custom trace stored in the memory.

9. The portable information handling system of claim 7 wherein the custom trace is selected from a group consisting of a shape, a set of initials, a letter, a number, and a design.

10. The portable information handling system of claim 6 wherein the trace is selected from a group consisting of a custom shape drawn on the gesture sensitive surface and a finger swipe along the entire length of the gesture sensitive surface.

11. A method for operating a portable information handling system wherein the portable information handling system is configured to perform various computing functions, comprising:
  receiving a custom trace on a gesture sensitive surface located on a top cover of the portable information handling system;
  storing the custom trace in a memory of the portable information handling system;
  receiving an input trace on the gesture sensitive surface of the portable information handling system, wherein the input trace is a movement of a finger of a user across the gesture sensitive surface of the portable information handling system;
  verifying that the input trace matches the custom trace stored in the memory;
  providing a visual indication via a display including a plurality of light emitting diodes located on the top cover of the portable information handling system, wherein the visual indication indicates that the input trace matches the custom trace, wherein the visual indication is the plurality of light emitting diodes lighting up one by one in a direction that the finger of the user is swiped across the gesture sensitive surface based on a current location of the finger on the gesture sensitive surface;

providing an unlock signal to a heat sensitive rod of an electronic latch in response to the input trace matches the custom trace stored in the memory, wherein the electronic latch comprises a hook portion connected to the heat sensitive rod located within a recess of the top cover of the portable information handling system and a catch portion located within a base of the portable information handling system;

constricting the heat sensitive rod in response to a current from the unlock signal, wherein constricting the heat sensitive rod decreases a length of the heat sensitive rod;

pulling the hook portion of the electronic latch, connected to the heat sensitive rod, from the catch portion of the base of the portable information handling system;

unlatching the top cover of the portable information handling system from the base via pulling the hook portion of the electronic latch from the base, wherein the base includes a front portion, a back portion, a left portion, a right portion, and a bottom portion, and wherein the top cover surrounds the entire front portion, the entire back portion, the entire left portion, and the entire right portion of the base wherein only the top cover and the bottom portion of the base are visible when the portable information handling system is closed; and slightly separating the top cover from the base, via a spring loaded mechanism between the top cover and the base in response to the electronic latch being unlocked.

12. The method of claim 11 wherein the visual indication is provided on a display.

13. The method of claim 11 wherein the custom trace is selected from a group consisting of a shape, a set of initials, a letter, a number, and a design.

14. The method of claim 11 wherein the input trace is selected from a group consisting of a custom shape drawn on the gesture sensitive surface and a finger swipe along the entire length of the gesture sensitive surface.

* * * * *